US012685327B2

(12) United States Patent
Nik et al.

(10) Patent No.: US 12,685,327 B2
(45) Date of Patent: Jul. 21, 2026

(54) MICROENCAPSULATION WITH POTATO PROTEINS

(71) Applicant: INTERNATIONAL FLAVORS & FRAGRANCES INC., New York, NY (US)

(72) Inventors: Amir Malaki Nik, Union Beach, NJ (US); Adam Toth, Union Beach, NJ (US); Ronald Gabbard, Union Beach, NJ (US)

(73) Assignee: INTERNATIONAL FLAVORS & FRAGRANCES INC., New York, NY (US)

( * ) Notice: Subject to any disclaimer, the term of this patent is extended or adjusted under 35 U.S.C. 154(b) by 906 days.

(21) Appl. No.: 17/425,764

(22) PCT Filed: Jan. 24, 2020

(86) PCT No.: PCT/US2020/014983
§ 371 (c)(1),
(2) Date: Jul. 26, 2021

(87) PCT Pub. No.: WO2020/154614
PCT Pub. Date: Jul. 30, 2020

(65) Prior Publication Data
US 2022/0095659 A1 Mar. 31, 2022

Related U.S. Application Data

(60) Provisional application No. 62/796,299, filed on Jan. 24, 2019.

(51) Int. Cl.
A23L 27/00 (2016.01)
A23D 7/005 (2006.01)
(Continued)

(52) U.S. Cl.
CPC ............ *A23L 27/72* (2016.08); *A23D 7/0053* (2013.01); *A23J 3/14* (2013.01); *A23L 2/56* (2013.01);
(Continued)

(58) Field of Classification Search
CPC .. A23J 3/14; A23L 27/72; A23L 27/80; A23L 2/56; A23L 29/10; A23P 10/35
See application file for complete search history.

(56) References Cited

U.S. PATENT DOCUMENTS 7,803,414 B2 9/2010 Van Lengerich et al.
8,465,911 B2 6/2013 Giuseppin et al.
(Continued)

FOREIGN PATENT DOCUMENTS

CN 106362653 A 2/2017
EP 2827726 A1 1/2015
(Continued)

OTHER PUBLICATIONS

Turchiuli et al., "Use of different supports for oil encapsulation in powder by spray drying". Available online as of 2014, Powder Technology, 255 (2014), 103-108. (Year: 2014).*
(Continued)

*Primary Examiner* — Jenna A Watts

(57) ABSTRACT

An emulsion and encapsulation particle containing an active material and an unhydrolyzed potato protein, as an emulsifier, are provided as is a method of producing the encapsulation particle.

20 Claims, 2 Drawing Sheets

(51) Int. Cl.

| | |
|---|---|
| *A23J 3/14* | (2006.01) |
| *A23L 2/56* | (2006.01) |
| *A23L 2/66* | (2006.01) |
| *A23P 10/35* | (2016.01) |

(52) U.S. Cl.
CPC ................. *A23L 2/66* (2013.01); *A23L 27/80* (2016.08); *A23P 10/35* (2016.08); *A23V 2002/00* (2013.01)

(56) References Cited

U.S. PATENT DOCUMENTS

| | | | |
|---|---|---|---|
| 9,149,063 | B2 | 10/2015 | Dhalleine et al. |
| 9,504,265 | B2 * | 11/2016 | Arfsten .................. A21D 13/32 |
| 2010/0074986 | A1 | 3/2010 | Bastiaans et al. |
| 2012/0035263 | A1 | 2/2012 | Giuseppin et al. |
| 2013/0251855 | A1 | 9/2013 | Given, Jr. et al. |
| 2016/0220502 | A1 * | 8/2016 | Livney ................. A61K 9/0095 |
| 2016/0324877 | A1 | 11/2016 | Buck et al. |

FOREIGN PATENT DOCUMENTS

| | | | | | |
|---|---|---|---|---|---|
| MY | | 127316 | A | * | 11/2006 ............. A23L 27/80 |
| WO | 2010/090983 | A1 | | | 8/2010 |
| WO | 2020/112009 | A1 | | | 6/2020 |

OTHER PUBLICATIONS

European Search Report for Application No. 20744399.5-1105/3914285, dated Oct. 17, 2022, 9 pages.

Gharsallaoui, et al., "Applications of spray-drying in microencapsulation of food ingredients: An overview," ScienceDirect, Food Research International 40 (2007) 1107-1121, 15 pages.

International Search Report for Application No. PCT/US2020/014983, dated Apr. 16, 2020. 3 pages.

Romero, et al., "Interfacial and Oil/Water Emulsions Characterization of Potato Protein Isolates," Journal of Agricultural and Food Chemistry, vol. 59, No. 17, Aug. 16, 2011, pp. 9466-9474.

* cited by examiner

MICROENCAPSULATION WITH POTATO PROTEINS

INTRODUCTION

This application is a 371 of International Application Serial No. PCT/US2020/014983, filed Jan. 24, 2020, and claims the benefit of priority from U.S. Patent Application Ser. No. 62/796,299, filed Jan. 24, 2019, the content of which is incorporated herein by reference in its entirety.

BACKGROUND

Flavors have been used extensively in almost all food products in the market to provide desirable sensorial experience. However, the majority of flavoring compounds are volatile and unstable under conventional food processing conditions. Encapsulation techniques can be used to overcome these issues by protecting the core flavoring compounds during manufacturing and storage. Encapsulation is a process in which an active ingredient is embedded within carrier matrices, which results in protection of core active compounds from the surrounding environment. Spray drying is the most commonly used encapsulation process in the food industry due to its continuous nature and adaptability to industrialization. The spray drying process normally involves an initial emulsification step, in which an emulsifier acts as a stabilizer for the core oil and carbohydrates (e.g., maltodextrins) act as film-forming materials. The emulsion is then converted into a free-flowing powder by spray-drying process.

Research has shown that the droplet size of the core oil dispersed within the aqueous phase of the emulsion has a significant impact on a number of critical parameters including flavor oil retention, surface free oil, and oxidation rates. Smaller droplet sizes improve the flavor retention, reduce the surface oil and decrease oxidation rates.

In addition to gum acacia and modified starches, milk proteins such as whey proteins and caseinate are the most common emulsifiers used in encapsulation applications (Gharsallaoui, et al. (2007) *Food Res. Internat.* 40:1107-1121). However, additional natural, clean label and sustainable ingredients are needed.

Soy proteins, pea proteins and potato proteins have been explored in food industry for vegetable oil and flavor encapsulation. See, US 2016/324877, US 2010/0074986, U.S. Pat. Nos. 9,504,265, 8,465,911, EP 2827726 B1, CN 106362653 and WO 2010/090983. Moreover, alkaline hydrolysates of potato proteins have been suggested for use as emulsifiers in food compositions (U.S. Pat. No. 9,149,063 B2).

SUMMARY OF THE INVENTION

This invention provides an emulsion composed of a (a) a plurality of oil droplets each containing an active material; and (b) a first emulsifier that is an unhydrolyzed potato protein, wherein the emulsion has a pH of 1 to 5, the plurality of oil droplets is dispersed in a continuous phase, and the oil droplets and unhydrolyzed potato protein are present in the emulsion at a ratio in the range of 10:1 to 1:10 (e.g., 5:1 to 1:5). In some embodiments, each of the plurality of oil droplets has a diameter of 0.1 µm to 20 µm. In other embodiments, the oil droplets are present in an amount of 0.1% to 60% by weight of the emulsion. In other embodiments, the unhydrolyzed potato protein is present in an amount of 0.1% to 60% by weight of the emulsion. In certain embodiments, the emulsion further includes a second emulsifier and/or an antioxidant. In particular embodiments, the emulsion has a pH of 3 to 4 and/or the oil droplets and unhydrolyzed potato protein are present in the emulsion at a ratio in the range of 2:1 to 1:2.

An encapsulation particle is also provided, wherein said encapsulation particle is composed of (a) an active material; and (b) a matrix material containing an unhydrolyzed potato protein and carrier, wherein the encapsulation particle has a diameter of 2 µm to 500 µm, the active material is dispersed within the matrix material, and the ratio between the active material and the unhydrolyzed potato protein is 10:1 to 1:10 (e.g., 5:1 to 1:5). In one embodiment, the carrier is present in an amount of 1% to 99% by weight of the encapsulation particle. In another embodiment, the carrier is inulin, maltodextrin, glycose syrup solid, maltose, sucrose, vegetable fiber, polyol or a combination thereof. In a further embodiment, the active material is selected from the group consisting of a fragrance, pro-fragrance, flavor, malodor counteractive agent, vitamin or derivative thereof, anti-inflammatory agent, fungicide, anesthetic, analgesic, antimicrobial active, anti-viral agent, anti-infectious agent, anti-acne agent, skin lightening agent, insect repellant, animal repellant, vermin repellant, emollient, skin moisturizing agent, wrinkle control agent, UV protection agent, fabric softener active, hard surface cleaning active, skin or hair conditioning agent, flame retardant, antistatic agent, taste modulator, cell, probiotic, colorant, vegetable oil, and combinations thereof. In certain embodiments, the active material is present in an amount of 0.1% to 60% by weight of the encapsulation particle. In other embodiments, the unhydrolyzed potato protein is present in an amount of 0.1% to 60% by weight of the encapsulation particle. In particular embodiments, the encapsulation particle further includes an antioxidant.

A method for producing an encapsulation particle is further provided by (a) emulsifying an active material such as a flavor, an unhydrolyzed potato protein and a carrier to obtain an oil-in-water emulsion, wherein the oil-in-water emulsion has a pH of 1 to 5, or more preferably 3 to 4, and the active material and the unhydrolyzed potato protein are provided at a ratio of 10:1 to 1:10 (e.g., 5:1 to 1:5); and (b) drying the oil-in-water emulsion, by, e.g., spray drying, freeze drying, spray chilling, fluidized bed drying, drum drying, vacuum drying, film drying, or a combination thereof.

DETAILED DESCRIPTION OF THE INVENTION

Figure 1:
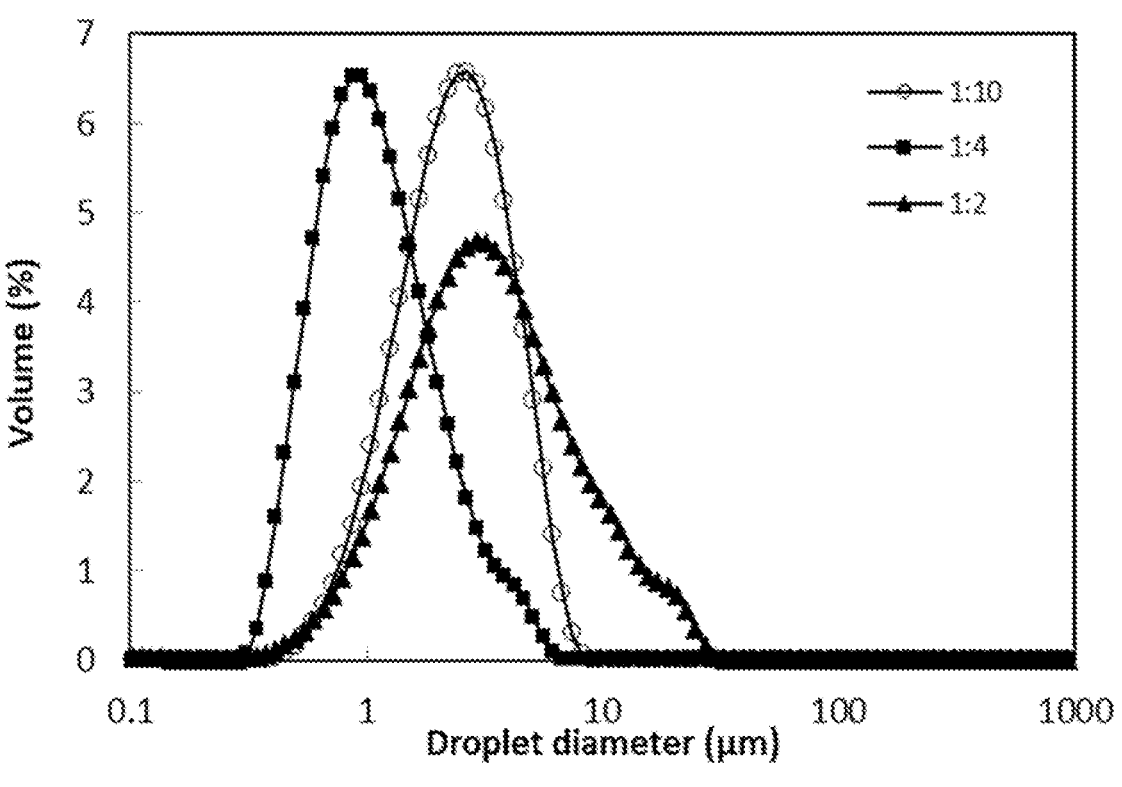
FIG. 1 shows the droplet size distributions of fresh emulsions stabilized with unhydrolyzed potato proteins using high pressure homogenization at pH 3. Protein to oil ratios shown are 1:10 (circle), 1:4 (square), and 1:2 (triangle).

It has now been found that potato proteins are of use as natural and functional wall materials for the encapsulation of volatile compounds. In particular, it has now been demonstrated that potato protein, specifically unhydrolyzed potato protein, facilitates emulsification and encapsulation of oil-based flavors. Accordingly, this invention provides an emulsion composed of an oil-based active material, e.g., flavor, and an emulsifier or emulsifying system including an unhydrolyzed potato protein alone or in combination with other surface-active ingredients. This invention also provides microcapsules having a plurality of oil droplets composed of an active material to be encapsulated and a solid matrix composed of a potato protein alone or in combination with a carrier, e.g., a low molecular weight carbohydrate carrier. This invention finds use in the production of natural liquid and dry flavor delivery systems suitable for a broad range of commercial applications. Advantageously, this invention allows for the replacement of synthetic emulsifiers with a natural, sustainably produced emulsifier without significantly sacrificing product performance.

As used herein, an "emulsion" refers to a mixture of two immiscible (unblendable) liquids. One liquid (the dispersed phase) is dispersed in the other (the continuous phase). Preferably, the aqueous phase is the continuous phase, and the oil phase is the dispersed phase; that is, the emulsion is an oil-in-water emulsion. Thus, an "aqueous phase" refers to a water-based composition which is substantially immiscible with the oil phase when present as the continuous component of an emulsion of the invention. Further, the term "oil phase" refers to a composition which is substantially immiscible with an aqueous phase when present as the oil component of an oil-in-water emulsion.

In accordance with this invention, the oil phase includes one or more active materials. An active material of use in this invention includes, but is not limited to, a fragrance, pro-fragrance, flavor, malodor counteractive agent, vitamin or derivative thereof, anti-inflammatory agent, fungicide, anesthetic, analgesic, antimicrobial active, anti-viral agent, anti-infectious agent, anti-acne agent, skin lightening agent, insect repellant, animal repellent, vermin repellent, emollient, skin moisturizing agent, wrinkle control agent, UV protection agent, fabric softener active, hard surface cleaning active, skin or hair conditioning agent, flame retardant, antistatic agent, taste modulator, cell, probiotic, colorant, pigment, antioxidant, vegetable oil (e.g., soy, sunflower, safflower, olive, corn, avocado or grapeseed oil), or a combination thereof.

Fragrances include, for example, benzaldehyde, benzyl acetate, cis-3-hexenyl acetate, cis-jasmone, coumarin, dihydromyrcenol, dimethyl benzyl carbinyl acetate, ethyl vanillin, eucalyptol, eugenol, iso eugenol, isobutyl salicylate, flor acetate, geraniol, hydroxycitronellal, koavone, LIFFAROME, dihydro linalool, linalool, methyl anthranilate, methyl beta naphthyl ketone, methyl dihydro jasmonate, nerol, nonalactone, orange flower ether, phenyl ethyl acetate, phenyl ethyl alcohol, phenyl propyl alcohol, phenoxy ethyl isobutyrate, phenoxanol, alpha terpineol, tetrahydro linalool, beta terpineol, vanillin, and the like.

Suitable flavors include, for example, fruit flavors, such as guava, kiwi, peach, mango, papaya, pineapple, banana, strawberry, raspberry, blueberry, orange, grapefruit, tangerine, lemon, lime, lemon-lime, etc.; tea flavors; coffee flavors; chocolate flavors; dairy flavors; methyl salicylate (wintergreen oil, sweet birch oil), nutmeg, bergamot cinnamon, cassia, neroli, coriander, lavender, and other flavors described herein.

Vitamins include any vitamin, a derivative thereof and a salt thereof. Examples include vitamin A and its analogs and derivatives (e.g., retinol, retinal, retinyl palmitate, retinoic acid, tretinoin, and iso-tretinoin, known collectively as retinoids), vitamin E (tocopherol and its derivatives), vitamin C (L-ascorbic acid and its esters and other derivatives), vitamin B3 (niacinamide and its derivatives), alpha hydroxy acids (such as glycolic acid, lactic acid, tartaric acid, malic acid, citric acid, etc.) and beta hydroxy acids (such as salicylic acid and the like).

Dyes, colorants or pigments include, e.g., lactoflavin (riboflavin), beta-carotene, riboflavin-5'-phosphate, alpha-carotene, gamma-carotene, cantaxanthin, erythrosine, curcumin, quinoline yellow, yellow orange S, tartrazine, bixin, norbixin (annatto, orlean), capsanthin, capsorubin, lycopene, beta-apo-8'-carotenal, beta-apo-8'-carotenic acid ethyl ester, xantophylls (flavoxanthin, lutein, cryptoxanthin, rubixanthin, violaxanthin, rodoxanthin), fast carmine (carminic acid, cochineal), azorubin, cochineal red A (Ponceau 4 R), beetroot red, betanin, anthocyanins, amaranth, patent blue V, indigotine I (indigo-carmine), chlorophylls, copper compounds of chlorophylls, acid brilliant green BS (lissamine green), brilliant black BN, vegetable carbon, titanium dioxide, iron oxides and hydroxides, calcium carbonate, aluminum, silver, gold, pigment rubine BK (lithol rubine BK), methyl violet B, victoria blue R, victoria blue B, acilan brilliant blue FFR (brilliant wool blue FFR), naphthol green B, acilan fast green 10 G (alkali fast green 10 G), ceres yellow GRN, sudan blue II, ultramarine, phthalocyanine blue, phthalocayanine green, fast acid violet R. Further naturally obtained extracts (for example paprika extract, black carrot extract, red cabbage extract) can be used for coloring purposes.

Examples of antioxidants include carotenoids (e.g., beta-carotene), vitamin C (Ascorbic Acid) or an ester thereof, citric acid, vitamin A or an ester thereof, tocopherols (e.g., vitamin E or an ester thereof), lutein or an ester thereof, lycopene, selenium, flavonoids, vitamin-like antioxidants such as coenzyme Q10 (CoQ10) and glutathione, phenolic acids and their esters, rosemary extract, curcumin and antioxidant enzymes such as superoxide dismutase (SOD), catalase and glutathione peroxidase, as well as butylated hydroxyanisole (BHA), butylated hydroxytoluene (BHT), propyl gallate or tert-butylhydroquinone (TBHQ).

Anti-inflammatory agents include, e.g., methyl salicylate, aspirin, ibuprofen, and naproxen. Additional anti-inflammatories include corticosteroids, such as, but not limited to, flurandrenolide, clobetasol propionate, halobetasol propionate, fluticasone propionate, betamethasone dipropionate, betamethasone benzoate, betamethasone valerate, desoximethasone, dexamethasone, diflorasone diacetate, mometasone furoate, halcinonide, fluocinonide, fluocinolone acetonide, desonide, triamcinolone acetonide, hydrocortisone, hydrocortisone acetate, fluoromethalone, methylprednisolone, and predinicarbate.

Anesthetics include benzocaine, butamben, butamben picrate, cocaine, procaine, tetracaine, lidocaine and pramoxine hydrochloride.

Suitable analgesics include, but are not limited to, ibuprofen, diclofenac, capsaicin, and lidocaine.

Non-limiting examples of anti-fungal agents include micanazole, clotrimazole, butoconazole, fenticonasole, tioconazole, terconazole, sulconazole, fluconazole, haloprogin, ketonazole, ketoconazole, oxinazole, econazole, itraconazole, torbinafine, nystatin and griseofulvin.

Non-limiting examples of antibiotics include erythromycin, clindamycin, synthomycin, tetracycline, metronidazole and the like.

Anti-viral agents include, but are not limited to, famcyclovir, valacyclovir and acyclovir.

In certain embodiments, the active material is a flavor. Flavors contemplated by the present invention include any liquid flavoring which is of food acceptable quality. The flavor may be an essential oil, synthetic flavor, or mixtures thereof including but not limited to oils derived from plants and fruits such as lemon, berry, orange, grapefruit, tangerine, lime, kumquat, mandarin, bergamot, citrus oils, fruit essences, peppermint oil, spearmint oil, clove oil, oil of wintergreen, anise, and the like. Artificial flavoring components are also contemplated by this invention.

Preferred flavors include, but are not limited to, anise oil; ethyl-2-methyl butyrate; vanillin; cis-3-heptenol; cis-3-hexenol; trans-2-heptenal; butyl valerate; 2,3-diethyl pyrazine; methyl cyclo-pentenolone; benzaldehyde; valerian oil; 3,4-dimethoxy-phenol; amyl acetate; amyl cinnamate; γ-butyryl lactone; furfural; trimethyl pyrazine; phenyl acetic acid; isovaleraldehyde; ethyl maltol; ethyl vanillin; ethyl valerate; ethyl butyrate; cocoa extract; coffee extract; peppermint oil; spearmint oil; clove oil; anethol; cardamom oil; wintergreen oil; cinnamic aldehyde; ethyl-2-methyl valerate; γ-hexenyl lactone; 2,4-decadienal; 2,4-heptadienal; methyl thiazole alcohol (4-methyl-5-β-hydroxyethyl thiazole); 2-methyl butanethiol; 4-mercapto-2-butanone; 3-mercapto-2-pentanone; 1-mercapto-2-propane; benzaldehyde; furfural; furfuryl alcohol; 2-mercapto propionic acid; alkyl pyrazine; methyl pyrazine; 2-ethyl-3-methyl pyrazine; tetramethyl pyrazine; polysulfides; dipropyl disulfide; methyl benzyl disulfide; alkyl thiophene; 2,3-dimethyl thiophene; 5-methyl furfural; acetyl furan; 2,4-decadienal; guiacol; phenyl acetaldehyde; β-decalactone; d-limonene; acetoin; amyl acetate; maltol; ethyl butyrate; levulinic acid; piperonal; ethyl acetate; n-octanal; n-pentanal; n-hexanal; diacetyl; monosodium glutamate; monopotassium glutamate; sulfur-containing amino acids, e.g., cysteine; hydrolyzed vegetable protein; 2-methylfuran-3-thiol; 2-methyldihydrofuran-3-thiol; 2,5-dimethylfuran-3-thiol; hydrolyzed fish protein; tetramethyl pyrazine; propylpropenyl disulfide; propylpropenyl trisulfide; diallyl disulfide; diallyl trisulfide; dipropenyl disulfide; dipropenyl trisulfide; 4-methyl-2-[(methyl-thio)-ethyl]-1,3-dithiolane; 4,5-dimethyl-2-(methylthiomethyl)-1,3-dithiolane; and 4-methyl-2-(methylthiomethyl)-1,3-dithiolane. These and other flavor ingredients are provided in U.S. Pat. Nos. 6,110,520 and 6,333,180, each of which is incorporated herein by reference.

As a first emulsifier, this invention provides for the use of an unhydrolyzed potato protein. As used herein, an "unhydrolyzed potato protein" refers to a potato protein that has not been hydrolyzed or broken down, partially or completely, into smaller polypeptides, peptides, or its component amino acids by, for example, an acid (e.g., a strong acid such as p-toluenesulphonic acid or hydrochloric acid) or base (e.g., sodium hydroxide), or using an enzyme (e.g., trypsin, chymotrypsin, pepsin, ficin, etc.). Unhydrolyzed potato proteins include denatured potato proteins and native (or undenatured) potato proteins. "Denatured protein" refers to a protein whose native secondary, tertiary or quaternary structure and/or chemical and/or biological properties have been altered by application of some external stress or compound such as an acid (e.g., acetic acid or trichloroacetic acid) or base (e.g., sodium bicarbonate or sodium sulphate), a concentrated inorganic salt (e.g., calcium chloride), an organic solvent (e.g., alcohol, ether, acetone or chloroform), UV radiation or heat without hydrolyzing the protein. "Native potato protein" is defined as protein isolated from potato tuber without any significant physical or (bio)chemical modification or inactivation, in particular denaturation or hydrolysis. The unhydrolyzed potato protein of this invention may be obtained from the tuber of any species of potato including *Solanum tuberosum, S. stenotomum, S. phureja, S. goniocalyx, S. ajanhuiri, S. chaucha, S. juzepczukii, S. curtilobum, S. brevicaule, S. fendleri, S. bulbocastanum* and/or *S. demissum*. In some embodiments, the unhydrolyzed potato protein isolate contains patatin (40 kDa glycoprotein), complex protein group (22 kDa) and/or proteinase inhibitor. In other embodiments, the unhydrolyzed potato protein isolate has an isoelectric point above 4.8, a molecular weight of more than 4 kDa and a glycoalkaloid concentration of less than 150 ppm. In addition, the isolate is preferably essentially free of organic acids and amino acids and has a protein content of more than 90%. An exemplary unhydrolyzed potato protein isolate is commercially available from Avebe (Veendam, The Netherlands) as Solanic® high-performance potato protein isolates, and described in U.S. Pat. No. 8,465,911, incorporated herein by reference in its entirety.

In addition to proteins from *Solanum* tubers, it is contemplated that other tuber proteins may be used in this invention including those from sweet potato, cassava, yams, and taro. Sweet Potato contains 1-10% protein on a dry weight basis. The major storage protein in sweet potato is 25 kDa sporamin which accounts for 80% by weight of total protein. Yams contain 1-3% protein on a dry weight basis and the major proteins accounting for 85% by weight of the total protein includes a number of isoforms with molecular weight of about 31 kDa. Taro contains from about 1-4.5% by weight protein. The mature taro protein is 188 amino acid residues in length with a mass of about 25 kDa. Cassava tuber contains only about 1-2% protein on a dry weight basis with low content of sulfur containing amino acids. The major protein of cassava has a molecular mass of about 22 kDa.

The emulsion and encapsulation particle of this invention can further include one or more preservatives such as ascorbic acid, citric acid, sodium benzoate, calcium propionate, sodium erythorbate, sodium nitrite, calcium sorbate, potassium sorbate, butylated hydroxyanisole (BHA), butylated hydroxytoluene (BHT), ethylenediaminetetraacetic acid (EDTA), tocopherols (vitamin E), and the like. In addition, one or more weighting agents are optionally included. Exemplary weighting agents are vegetable oils, castor Oil, brominated vegetable oils (BVO), medium chain triglycerides (MCTs), ester gum (EG), damar gum (DG), sucrose acetate isobutyrate (SAIB), and the like.

An emulsion of the invention is suitably prepared by: (i) bringing into association the constituents of the oil phase and an aqueous phase containing the unhydrolyzed potato protein to form a mixture; and (ii) homogenizing the mixture to form the emulsion composed of a plurality of oil droplets (e.g., flavor droplets) dispersed in the continuous aqueous phase. The step of bringing the oil phase and aqueous phase into association may be accomplished in any one of a number of ways. For example, the oil phase may be added to the aqueous phase; alternatively, the aqueous phase may be added to the oil phase. However, it is not necessary to prepare the oil phase or aqueous phase prior to bringing them into association, and in an alternative process the constituents of the aqueous phase and the constituents of the oil phase may be added together in any convenient order. In one preferred embodiment, however, the oil phase and the aqueous phase are prepared separately before being combined.

Homogenizing, as used herein, refers to a process whereby the aqueous phase and oil phase are transformed into a stable emulsion of oil phase droplets within the continuous aqueous phase. In some embodiments, the emulsion is made by first dispersing the oil phase in the aqueous phase with the unhydrolyzed potato protein dissolved in the aqueous phase using a high shear mixer, for example a Silverson L4R type mixer. Desirably, the emulsified oil phase forms droplets having a diameter of from of 0.1 μm to 20 μm. To achieve the desired droplet size, the emulsion may be passed through a high-pressure piston homogenizer (e.g., a GEA Niro Soavi's Panda Plus 2000 laboratory homogenizer) for several passes under high air pressure of, e.g., 5000 psi.

The results herein demonstrate that unhydrolyzed potato protein-stabilized emulsions resulted in an increase in mean droplet size and increase in emulsion viscosity at pH 7. In contrast, at low pH, unhydrolyzed potato protein maintained a clear dispersion and prevented droplets from aggregating. Accordingly, in certain embodiments, the pH of the emulsion is 1, 2, 3, 4, or 5 or in a range between any combination of these pH values. Preferably, the pH of the emulsion is between 1 and 5. More preferably, the pH of the emulsion is between 3 and 4.

The aqueous phase of an emulsion is present in an amount of 10%, 15%, 20%, 25%, 30%, 35%, 40%, 45%, 50%, 55%, 60%, 65%, 70%, 75%, 80%, 85%, 90%, 95% or 99.9% by weight of the emulsion or in a range between any combination of these amounts. Preferably, the oil droplets of the emulsions herein are present in an amount of 0.1%, 0.5%, 1%, 10%, 15%, 20%, 25%, 30%, 35%, 40%, 45%, 50%, 55% or 60% by weight of the emulsion or in a range between any combination of these amounts. More particularly, oil droplets of emulsions are present in an amount of from 0.1% to 60% by weight of the emulsion. Similarly, an active material of an encapsulation particle is present in an amount of 0.1%, 0.5%, 1%, 10%, 15%, 20%, 25%, 30%, 35%, 40%, 45%, 50%, 55% or 60% by weight of the encapsulation particle described herein or in a range between any combination of these amounts. More preferably, the active material is present in an amount of from 0.1% to 60% by weight of the encapsulation particle.

In accordance with this invention, the unhydrolyzed potato protein of the emulsions herein is present in an amount of 0.1%, 0.5%, 1%, 10%, 15%, 20%, 25%, 30%, 35%, 40%, 45%, 50%, 55% or 60% by weight of the emulsion or in a range between any combination of these amounts. More particularly, the unhydrolyzed potato protein of emulsions is present in an amount of from 0.1% to 60% by weight of the emulsion (e.g., 0.1% to 30%, 0.1% to 25%, and 0.1% to 20%). Similarly, the unhydrolyzed potato protein of an encapsulation particle is present in an amount of 0.1%, 0.5%, 1%, 10%, 15%, 20%, 25%, 30%, 35%, 40%, 45%, 50%, 55%, 60%, 65%, 70%, 75%, 80%, 85% or 90% by weight of an encapsulation particle described herein or in a range between any combination of these amounts. More preferably, the unhydrolyzed potato protein is present in an amount of from 0.1% to 60% by weight of the encapsulation particle.

The ratio of active material (e.g., flavor) to unhydrolyzed potato protein in the compositions herein is ideally 10:1, 9:1, 8:1, 7:1, 6:1, 5:1, 4:1, 3:1, 2:1, 1:1, 1:2, 1:3, 1:4, 1:5, 1:6, 1:7, 1:8, 1:9 or 1:10 by weight of the composition or in a range between any combination of these ratios. In some embodiments, the oil droplets and unhydrolyzed potato protein of an emulsion described herein are present in the emulsion at a weight ratio in the range of 10:1 to 1:10, preferably 5:1 to 1:5, or more preferably in the range of 2:1 to 1:2. In other embodiments, the active material and unhydrolyzed potato protein are present in an encapsulation particle at a weight ratio in the range of 10:1 to 1:10, preferably 5:1 to 1:5, or more preferably in the range of 2:1 to 1:2, by weight of the composition. In certain embodiments, the ratio of active material (e.g., flavor) to unhydrolyzed potato protein is at least 4:1. In other embodiments, the ratio of active material (e.g., flavor) to unhydrolyzed potato protein is at least 2:1.

Depending on the active material and application, the compositions herein (i.e., emulsions and encapsulation particles) may include additional components such as a second emulsifier and/or an antioxidant as described herein. The second emulsifier may be any emulsifier including simple surfactants such as saponins extracted from quillaja tree or *yucca*, sorbitan esters of fatty acids, glyceryl/polyglyceryl esters of fatty acids, glycerin esters of fatty acids such as monoglycerides, acetic acid esters of monoglycerides such as acetylated monoglyceride, lactic acid esters of monoglycerides such as lactylated monoglyceride, citric acid esters of monoglycerides, succinic acid esters of monoglycerides, diacetyl tartaric acid esters of monoglycerides, polyglycerol esters of fatty acids, polyglycerol polyricinoleate, propylene glycol esters of fatty acids, sugar esters of fatty acids including sucrose esters, calcium and/or sodium stearoyl-2-lactate, polysorbates, sodium bis(2-ethylhexyl) sulfosuccinate, surface active phospholipids/lecithins including enzyme-hydrolyzed lecithins, glycolipids, carbohydrate-based surfactants, poly/oligo saccharides, proteins (including milk proteins, soy proteins, whey proteins, egg white proteins, gelatin, wheat proteins, tobacco protein fractions), protein hydrolysates, stearoyl lactylate and salts thereof, stearoyl fumarate and salts thereof, glyceryl monostearate, and detergents of the SPAN® or TWEEN® series. The surfactants from the above series may be used singly or in combination. Furthermore, diblock copolymers such as types using poly(oxyethylene) ("PEO") and poly(oxypropylene) ("PPO"), i.e., PEO/PPO types and triblock copolymers (PEO/PPO/PEO types) can be used for emulsion stabilization. The emulsifiers or surfactants may be anionic, cationic, amphoteric, non-ionic or neutral. Those having a higher hydrophile-lipophile balance ("HLB") will favor oil-in water emulsion formation, while lower HLB surfactants/emulsifiers will favor the water-in-oil emulsion formation.

Active materials in an oil phase are preferably encapsulated within a matrix composed of unhydrolyzed potato protein and a carrier. Accordingly, this invention also provides an encapsulated particle composed of (a) an active material, and (b) a matrix containing an unhydrolyzed potato protein and carrier, wherein the active material is dispersed within the matrix. Matrices of the invention encapsulate active materials (e.g., flavors or fragrances) in a discontinuous phase of inclusions of oil dispersed within a continuous phase of matrix material. The oil may be used as a solvent for the active, or may be an active in its own right. Encapsulation particles may have a spherical shape, but also may be a shape other than spherical. Encapsulation particles of this invention have a diameter preferably in the range of 0.2 μm to 500 μm (e.g., 0.5 μm to 120 μm, 2 μm to 500 μm, 2 μm to 300 μm, and 2 μm to 150 μm).

Carriers of use in the matrix are preferably solid carriers such as disaccharides, e.g., sucrose, maltose, lactose, trehalose, cellobiose, and the like; polysaccharides, e.g., raffinose, maltodextrin, inulin (from chicory root, Jerusalem artichoke, blue agave, garlic or onion) and the like; mixtures of carbohydrates, e.g., glycose syrup solids; a vegetable fiber, e.g., cellulose or starch; polyols such as sorbitol, mannitol, maltitol, lactitol, xylitol, isomalt, erythritol; or a combination thereof. Preferably, the average molecular weight of the carrier is less than 10000 g/mol, or more preferably less than 8000 g/mol.

The carrier may be present in the encapsulation particle in an amount of 1%, 5%, 10%, 20%, 30%, 40%, 50%, 60%, 70%, 80%, 90% or 99% by dry weight of the encapsulation particle or in a range between any combination of these amounts. In certain embodiments, the carrier is present in the encapsulation particle in an amount in the range of 1% to 99% by weight of the encapsulation particle.

The encapsulation particle of the invention is produced by (a) emulsifying or homogenizing an active material with a potato protein and a carrier in water to obtain an emulsion, wherein the emulsion has a pH of 1 to 5, and the active material and the potato protein are provided at a ratio of 10:1 to 1:10; and (b) drying the emulsion. Any suitable method for drying the emulsion can be used including, but not limited to spray drying, freeze drying, spray chilling, fluidized bed drying, drum drying, vacuum drying, film drying, or a combination thereof. Desirably, the moisture content of the dried encapsulation particle is less than 10% or more preferably less than 5%. Preferably, the water activity of the dried encapsulation particle is less than 0.5 or more preferably less than 0.3.

The following non-limiting examples are provided to further illustrate the present invention.

Example 1: Materials and Methods

Materials. Potato protein isolate (SOLANIC® 300) with 92% protein content was provided by Avebe (Veendam, Netherlands). The protein content of the protein isolates used in this invention was provided by supplier. Inulin derived from blue agave and chicory root (ORAFTI® GR) was obtained from Ciranda (Hudson, WI) and Beneo (Belgium), respectively. High oleic acid sunflower oil and natural tomato flavor (2-fold in high oleic sunflower oil) were provided by IFF application center (South Brunswick, NJ).

Protein Solubility Measurements. Protein solubility was determined by dispersing 10 grams of each protein sample in 90 grams of tap water and stirring for 2 hours at ambient temperature to obtain uniform dispersions. The stability of the protein dispersions was monitored and recorded after 24 hours.

Preparation of Oil-in-Water Emulsions. An emulsifier solution was prepared by dispersing unhydrolyzed potato protein isolate in water under constant agitation using an overhead mixer at 300 rpm for 1 hour at ambient temperature until proteins were fully dissolved. An oil-in-water emulsion was then prepared by emulsifying high oleic sunflower oil into the emulsifier solution using a Silverson high shear mixer at 6000 rpm for 5 minutes followed by passage through a two-stage high-pressure piston homogenizer (GEA Niro Soavi's Panda PLUS 2000: laboratory homogenizer) at 5000 psi for 2 passes.

Preparation of Spray Dry Flavor Emulsions. The aqueous carrier solution was prepared by dissolving the unhydrolyzed potato protein isolate in tap water at ambient temperature using an overhead mixer. Carrier materials (inulin from blue agave and chicory root) were subsequently added into the aqueous solution followed by stirring at 500 rpm for 1 hour or until solid materials were fully dissolved. The aqueous solution was then cooled down to approximately 15° C. before adding the flavor oil thereby minimizing the loss of flavor during the emulsification process. The tomato flavor oil (as a model flavor) was added into the aqueous solution followed by emulsification using a Silverson Verso in-line rotor/stator mixer at 2500 rpm and circulation rate of 1 Kg per minute. The flavor emulsion was composed of 6 wt % tomato flavor oil, 6 wt % unhydrolyzed potato proteins isolates, 38 wt % inulin derived from blue agave, 10 wt % inulin derived from chicory root, and 40 wt % deionized water.

Preparation of Spray Dried Flavor Microcapsule. The flavor emulsion was dried using a pilot scale Anhydro MicraSpray MS-400 spray dryer connected to a fluid bed unit for additional agglomeration and water evaporation. The inlet air temperature was adjusted to 65° C. to 250° C. (e.g., 75° C., 85° C., 95° C., 105° C., 115° C., 125° C., 135° C., 155° C., 175° C., 200° C., 230° C. or 250° C.) and the outlet temperature was kept at 35° C. to 125° C. (e.g., 45° C., 55° C., 65° C., 75° C., 85° C., 95° C., 105° C. or 115° C.) by controlling the flow rate. Two fluid nozzle atomizers were used to atomize the flavor emulsion inside the dryer at a feed rate of 10 kg/hour and an air flow rate of 3 bar/hour. In order to maintain homogeneity and to prevent coalescence of oil droplets, the emulsions were gently stirred while being fed into the spray dryer. The finished spray-dried microcapsules were collected in the cyclone collection vessel and stored in a sealed aluminum bag at −5° C. until analyzed.

Emulsion Viscosity Measurements. The apparent viscosity of both oil-in-water emulsions and flavor emulsions was measured using a Brookfield viscometer using spindles #4 at 60 RPM. The viscosity of oil-in-water emulsions was measured at ambient temperature whereas the viscosity of flavor emulsions was measured at 15° C.

Droplet and Particle Size Measurements. The droplet size distribution of emulsions was measured using a Beckman Coulter LS 13 320 Laser Diffraction Particle Size Analyzer. Distilled water was used as the dispersant. The powder particle size distributions of microcapsules were measured using a Mastersizer 3000 laser light scattering instrument (Malvern Instruments Ltd., Worcestershire, UK) equipped with a powder sample handling unit. Droplet/particle distributions were calculated by the instrument according to the Fraunhofer Theory which uses the refractive index difference between the droplets and the dispersing medium to predict the intensity of the scattered light. Droplet/particle size measurements were reported as droplet/particle size distribution and droplet/particle diameters.

Zeta-Potential Measurements. Emulsions were diluted to a droplet concentration of approximately 0.006 wt % using buffer solutions having a pH in the range of pH 3 to 7. The zeta-potential of the droplets was then determined using a Zetasizer Nano ZS (Malvern Instruments, Worcestershire, UK) that measures the direction and velocity of droplet movement in the applied electric field. An individual zeta-potential measurement was determined from the average of five readings taken on the same sample.

Moisture Content and Water Activity Measurements. The moisture content of the spray-dried powder was determined using Mettler Toledo Volumetric KF titrator equipped with Stromboli oven. Powder Samples, 0.12 to 0.17 grams, were weighed and placed in a Stromboli vial which was heated to 150° C. Dry $N_2$ gas flows through the vial and carries the moisture to the titration unit. Hydranal™ Composite 5K was used as titrant. Hydranal™ Ketosolver was used as solvent. Water content was measured in % w/w of the sample. Average of three measurements was taken and reported as % water in the sample. The water activity was determined using an AQUALAB 4TEV water activity meter (Decagon Devices, Inc., Pullman, WA). Samples were placed in a disposable sample cup, completely covering the bottom of the cup. The sample cup was then loaded into the instrument for measurement. At least duplicate measurements were carried out and the average of the measurements are reported herein.

Microcapsule Surface and Total Oil Measurements. Samples (about 1.0-2.0 grams) were placed into a 4-gram vial and the exact weights were recorded. Approximately 10 mL (6.7 grams) of hexane was added and the exact weight was again recorded. The sample was then placed on the tube rotator for 10 minutes. An aliquot of the sample was filtered with a 0.45 μm nylon syringe filter into an autosampler vial. The surface oil was measured using gas chromatographic (GC) instrument equipped with flame ionization detector and quantified using standard solutions. Total oil content of the microcapsules was determined based on calculation of total volatile retention as described herein. Encapsulation efficiency (EE) was calculated as follows: EE=(total oil content−solvent extractable oil)/total oil content×100%.

Flavor Volatile Retention Measurements. The amounts of individual aroma compounds retained in the spray dry emulsion and spray dried microcapsule were determined by GC analysis. Approximately 1.0 gram of spray dry powder or 2.0 grams of liquid emulsion was placed into a 50 ml centrifuge tube. Deionized water (5 mL) was added into the tube and the mixture was vortex at high speed for 1 minute to dissolve or homogenize the sample. When the sample was totally dissolved, 5 ml of extraction solvent (acetonitrile containing 0.05% ethyl valerate as internal standard) was pipetted into the same tube, and the sample was vortexed at high speed for 1 minute. Anhydrous magnesium sulfate (4.0 grams) was added to the sample and the sample was vortexed immediately at high speed for 1 minute. The tubes were then centrifuged and the clear extract was transferred to a 2 mL screw-cap vial and analyzed by GC/FID (Agilent 6850 or equivalent). Concentrations of individual aroma compounds (mg/g powder) in each spray dried powder or flavor emulsion were determined via linear regression ($R^2>0.99$) obtained from 3-point calibration curves using neat oil, which went through the same extraction procedure. Target flavor components were identified using both retention indices and/or mass spectrometry. The aroma retentions of the individual compounds were expressed as a percentage of their initial amount in the powder or emulsions.

Scanning Electron Microscopy (SEM). A JSM 6360 model (JEOL Co., Ltd., Tokyo, Japan) scanning electron microscope was used to investigate the microstructural properties of the spray-dried microencapsulated flavor. Samples were mounted onto the carbon tape on top of a copper mount. In order to examine the inner structure, the particles were fractured using a knife. All samples were analyzed using the SEM operating at 15 kV. At least five pictures of each sample were taken to represent the structure of the microcapsule.

Example 2: Aqueous Solubility of Unhydrolyzed Protein Isolates

The aqueous solubility of unhydrolyzed potato protein at pH 3 and pH 7 was examined. The solubility of a protein is the most important functional property since the protein needs to be soluble in order to be applicable in food systems. Other functional properties such as emulsification, foaming, and gelation are dependent on the solubility of proteins (Vaclavik & Christian (2003) *Essentials of Food Science*. Second edition, New York). Protein solubility is markedly affected by pH (where it is minimal near or at the isoelectric point), ionic strength, ion types, temperature, solvent polarity, and processing conditions. The potato protein dispersion (10 wt %) was analyzed at time zero and after 24 hours. This analysis indicated that the solubility of the potato protein isolate was highly impacted by pH. At pH 7, the potato protein dispersion was turbid and homogeneous at time zero. However, gradual and significant precipitation and separation was observed over time. In particular, the potato protein at pH 7 had almost completely separated into two phases. In stark contrast, the pH 3 potato protein sample was a clear dispersion at time zero and remained clear and stable with no separation or precipitation over time (i.e., after 24 hours).

Example 3: Emulsification Properties of Unhydrolyzed Potato Proteins

The emulsification properties of unhydrolyzed potato proteins in oil-in-water emulsion system were investigated. In general, suitability of a protein isolate as an emulsifier depends on the rate at which proteins diffuse into the oil-water interface and create strong interfacial film around oil droplets and prevent droplet aggregation and coalescence. A protein with ideal qualities as an emulsifier for an oil-in-water emulsion would have a relatively low molecular weight, good water solubility, a balanced amino acid composition in terms of charged, polar and non-polar residues, well-developed surface hydrophobicity, and a relatively stable conformation (Belitz, et al. (2009) *Food Chemistry*, 4th Ed. Springer, Berlin (Chapter 2)). In order to evaluate the emulsification properties of potato proteins, 20 wt % sunflower oil-in-water emulsions were prepared at pH 3 using 2 wt % (1:10 protein to oil ratio), 5 wt % (1:4 protein to oil ratio), and 10 wt % (1:2 protein to oil ratio) potato protein isolates as emulsifier. The results of this analysis are presented in FIG. 1.

Figure 2:
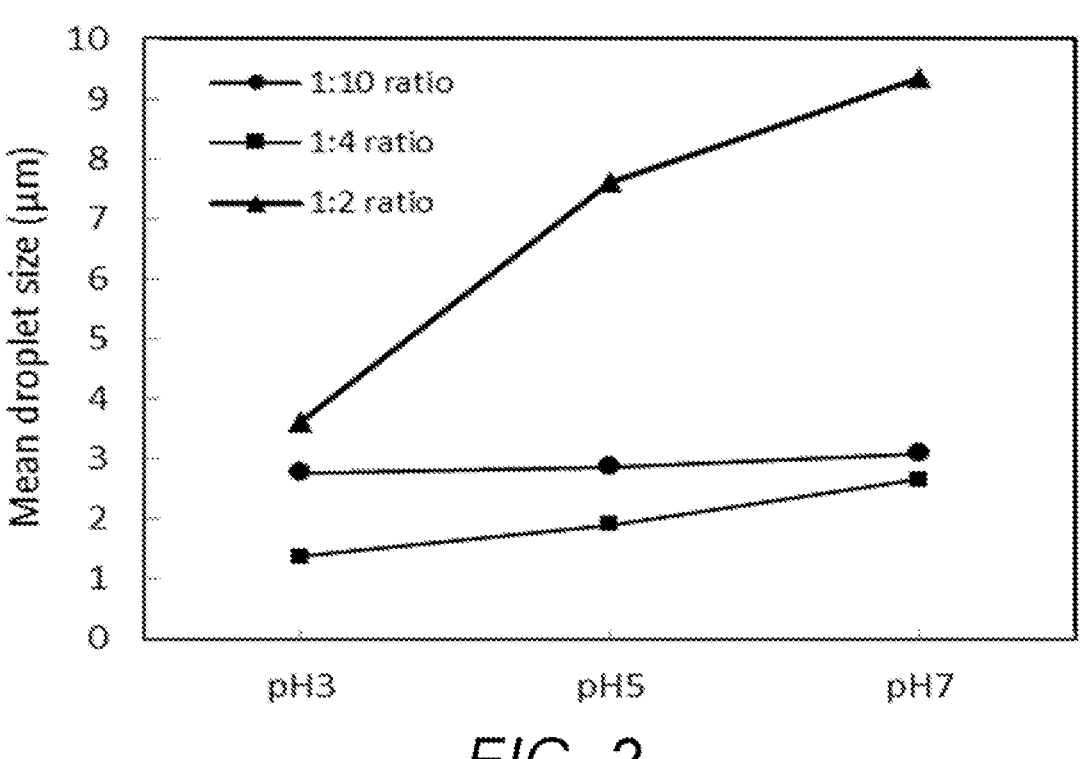
FIG. 2 shows the mean droplet size of unhydrolyzed potato protein-stabilized emulsions at different pH values.
Figure 3:
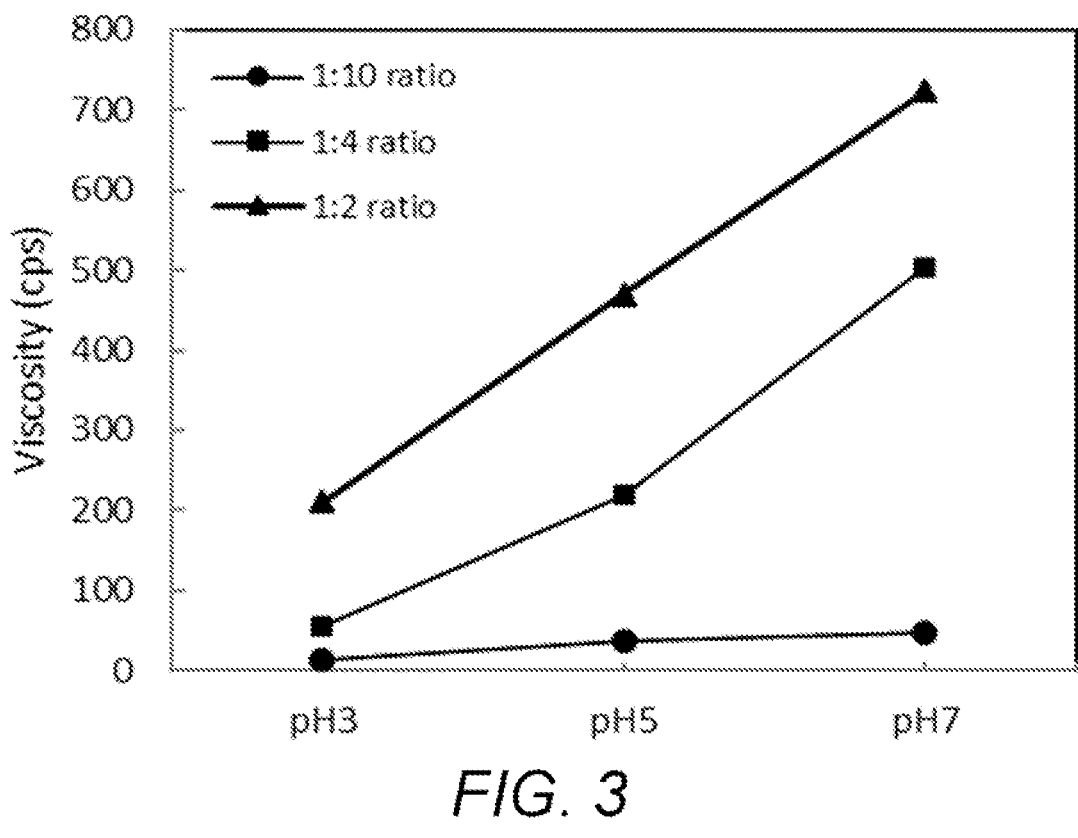
FIG. 3 depicts the emulsion viscosity of unhydrolyzed potato protein-stabilized emulsions at different pH values.
Figure 4:
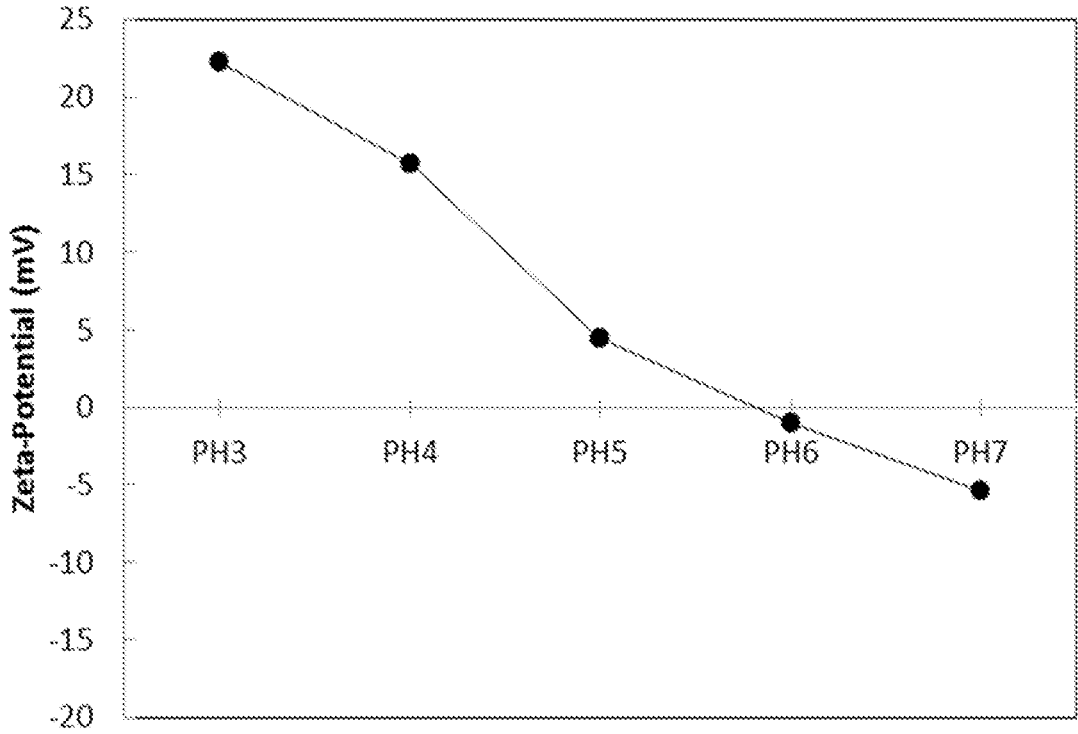
FIG. 4 depicts the zeta-potential measurements of emulsions stabilized with unhydrolyzed potato protein isolate.

The impact of change in pH on physicochemical properties and microstructure of potato protein-stabilized emulsion was also examined. It is known that the pH of emulsion-based foods and beverages varies significantly depending upon the kind of food products in which the oil droplets are present. In addition, the stabilization of emulsions against coalescence and flocculation is largely dependent on the repulsive forces between the protein films adsorbed onto the emulsion droplets (McClements (2004) *Curr. Opin. Colloid Interface Sci.* 9(5):305-313), which might alter based on pH change. At pH 3, emulsions stabilized with 2 wt % potato protein isolates (1:10 ratio) showed narrow and monomodal distribution with mean droplet size of around 2.7 μm (FIG. 2) and apparent viscosity of 14 cps (FIG. 3). An increase in protein content (1:4 ratio) provided emulsions with a significantly smaller droplet size of around 1.3 μm and viscosity of 56 cps. A further increase in protein content (1:2 ratio) caused a significant increase in mean droplet size to approximately 3.6 μm and viscosity of about 210 cps. However, the optical micrograph of this emulsion showed heavily aggregated structures indicating that the mean droplet size was related to aggregates rather than individual droplets. It appeared than an excess amount of protein in the emulsion systems resulted in bridging flocculation between oil droplets leading to higher mean droplet size. Regardless of protein to oil ratio, potato protein-stabilized emulsions showed zeta-potential value of +22.24 mV at pH 3 (FIG. 4).

Just as in the case with solubility, pH affected the emulsifying properties of all the emulsions regardless of the protein to oil ratio; however, the impact was more profound for emulsions with higher protein content. At pH 5, significant increases in mean droplet diameter were observed for all the emulsions, in particular for emulsions with higher protein content (1:4 and 1:2 ratios) (FIG. 2). Similar profiles were found for emulsion viscosities in which a significant increase in viscosity as a function of higher pH was observed for all the emulsions (FIG. 3). Increases in mean droplet size and emulsion viscosity continued at pH 7 indicating the significant impact of pH on physicochemical properties of the potato protein-stabilized emulsions. It is important to note that the increase in mean droplet size as measured by particle size analyzer is mainly due to formation of droplet aggregates rather than an increase in size of individual droplets. Potato protein-stabilized emulsions had a zeta-potential value of +4.4 mV at pH 5 and −5.35 mV at pH 7. Such a low magnitude of absolute zeta-potential values at both pH 5 and pH 7 could be attributed to the emulsions being at or near to the isoelectric point (pI) of potato proteins, which would mean surface neutrality, i.e., the number of positively charged amino groups being balanced by the number of negatively charged carboxyl groups at the surface. The pI of the potato protein-stabilized emulsions was identified to be at pH 6 based on zeta-potential measurements (FIG. 4). Significant increases in emulsion viscosities and mean droplet sizes observed at pH 5 and 7 could be attributed to ineffectiveness of electrostatic repulsion of potato proteins adsorbed at oil-water interface to prevent the droplets from aggregating together thereby resulting in significant droplet aggregation and subsequent increases in viscosity and particle size.

The results indicated that emulsifying ability and emulsion stability of potato protein isolates considerably varied with the protein concentration and pH of the emulsion. It was shown that potato protein-stabilized emulsions were prone to droplet flocculation and aggregation at pH values close to their pI (around pH 6). Hence, the most likely stabilization mechanism preventing droplet aggregation in potato protein-stabilized emulsions was electrostatic repulsion.

The emulsification properties of potato proteins are very different and unique compare to other plant-based proteins used in food industry. For example, soy and pea proteins exhibit the best emulsifying properties at higher pH values (Soderberg (2013) *Functional properties of legume proteins compare to egg proteins and their potential as egg replacers in vegan food*. Thesis submitted to the faculty of the graduate school of Swedish University of Agricultural sciences). By comparison, potato proteins exhibited a lower emulsifying capacity at pH 5 to 7 (near pI) and best emulsification properties around pH 3.0, where the proteins have a strong positive charge.

Example 4: Spray Dried Emulsions

An emulsion suitable for spray dry application was prepared with potato protein isolate. The final spray dry emulsion was composed of 12 wt % sunflower oil, 6 wt % potato protein, 30% blue agave inulin, 12% maltose, and 40 wt % water. The emulsion was prepared at pH 7 using a continuous lab in-line process which is different than conventional high pressure homogenization. The details of the process are provided in Example 1. The mean droplet size and emulsion viscosity were 8.78 μm and 683.3 cps, respectively.

The results showed that the potato protein isolate was capable of stabilizing oil-in-water emulsions with a mean droplet size suitable for spray dry encapsulation processes. Notably, small oil droplet size minimizes microcapsule surface oil, increases oil encapsulation efficiency, and decreases oxidation rates.

As described herein, the zeta-potential values of the oil-water interface significantly impacts the stability of protein-stabilized emulsions. For this reason, the zeta-potential values of the potato protein-stabilized emulsions were measured at five different pH values (FIG. 4). This analysis indicated that the potato protein-stabilized emulsion had a positive zeta potential value below pH 6 and negative value above pH 6 indicating that the pI of the potato protein is around pH 6. In contrast, the pI of emulsions stabilized with other plant-based proteins (i.e., soy and pea protein isolates) is around pH 4.

Example 5: Protein to Oil Ratios and Viscosity Modulation

The impact of protein to oil ratio along with viscosity of continuous phase on emulsification properties of the potato proteins were examined. The ability of an emulsifier to form a stable emulsion before drying is a prerequisite for high microencapsulation efficiency. This experiment was carried out using potato proteins (at different protein to oil ratios) in combination with low molecular weight carbohydrates to develop formulae with different protein to oil ratios and different viscosities. All of the emulsions were prepared using a high shear overhead mixer followed by an in-line lab emulsification process. The aqueous solution containing the emulsifier (plant protein isolates) and carrier material (inulins or maltose) was dissolved in water using an overhead mixer at 500 rpm for 1 hour. The tomato flavor oil (tomato-flavored in sunflower oil) was added into the aqueous solution followed by emulsification at 2500 rpm and circulation rate of 1 Kg per minute. Of note, an emulsion with 0% potato protein did not form an emulsion because inulin did not function as a surface active material. The composition of each formula tested in this example is listed in Table 1.

TABLE 1

| | Formula | | | |
|---|---|---|---|---|
| Ingredient | 1 | 2 | 3 | 4 |
| Tomato Flavor Oil | 20 wt % | 20 wt % | 10 wt % | 10 wt % |
| Potato Protein Isolate | 10 wt % | 10 wt % | 10 wt % | 20 wt % |
| Blue Agave Inulin | 50 wt % | 50 wt % | 50 wt % | 50 wt % |
| Chicory Root Inulin | — | 20 wt % | 30 wt % | 20 wt % |
| Maltose | 20% | — | — | — |

As shown in Table 2, the emulsification properties of the unhydrolyzed potato proteins were improved by increasing the emulsifier to oil ratio. In other words, an increase in protein to oil ratio from 1:2 (protein to oil ratio) to 1:1 resulted in significant decrease in droplet size distribution, Formula 3 versus Formula 1. Further, an increase in protein content (2:1 protein to oil ratio) had no impact on emulsion droplet size and droplet size remained the same, Formula 4 versus Formula 3 (Table 2). In addition, an increase in continuous phase viscosity by replacing maltose or agave inulin with chicory inulin led to emulsions with smaller droplet sizes than the ones with lower viscosity, Formula 2 versus Formula 1. Compared to inulin derived from chicory root, inulin derived from blue agave and maltose had a lower molecular weight, which led to an emulsion with lower apparent viscosity.

TABLE 2

| Characteristic | Formula | | | |
| --- | --- | --- | --- | --- |
| | 1 | 2 | 3 | 4 |
| Mean Droplet Size (μm) | 8.78 | 5.96 | 3.10 | 3.10 |
| Viscosity (cps) | 683.3 | 1717 | 2863 | 1770 |

An increase in viscosity not only improves the emulsifying activity but also the emulsion stability due to lower droplet mobility in the emulsions. The results presented in this study indicate that the emulsifying properties of unhydrolyzed potato protein can be improved by using a particular protein to oil ratio and viscosity of the continuous phase.

Example 6: Spray Dried Emulsions Containing a Carrier

To evaluate the inclusion of a carrier, tomato flavor microcapsules were prepared using potato protein isolate combined with a low molecular weight carbohydrate (i.e., inulin). In this analysis, a blend of two types of inulin (derived from blue agave and chicory root) were used as wall materials (i.e., film forming agents) to improve the microencapsulation process. Inulins are a group of naturally occurring plant polysaccharides (fructose polymers) with a degree of polymerization ranging from 2 to 60. They can be extracted from various sources; however, chicory root, artichoke, and blue agave are conventional sources of inulin. In terms of physicochemical properties, inulins exhibit good water solubility, low viscosity at high solids contents, and good film forming properties, which are important for spray drying encapsulation. In this analysis, a mixture of 600 grams potato protein isolate, 3600 grams inulin derived from blue agave, and 1200 grams inulin derived from chicory root were dissolved in 4000 grams tap water followed by cooling to about 15° C. Subsequently, 600 grams of tomato flavor (2-fold dissolved in high oleic sunflower oil) was added into the mixture follow by pre-homogenization using a Silverson high shear mixture at 6000 rpm for 5 minutes. The coarse emulsions were then homogenized using Silverson Verso in line rotor-stator mixer at 2500 rpm and circulation rate of 1 Kg per minute. The flavor emulsion was then spray dried using a pilot scale Anhydro MicraSpray MS-400 spray dryer with a centrifugal atomizer installed. The inlet temperature was 65° C. to 250° C. (e.g., 75° C., 85° C., 95° C., 105° C., 115° C., 125° C., 135° C., 155° C., 175° C., 200° C., 230° C. or 250° C.) and the outlet temperature was kept at 35° C. to 125° C. (e.g., 45° C., 55° C., 65° C., 75° C., 85° C., 95° C., 105° C. or 115° C.). The flow rate was kept at about 50 mL/minute. The potato protein microcapsules were characterized for their encapsulation efficiency, moisture content, water activity, particle size, particle morphology, and flavor retention as described herein.

Characteristics of Flavor Emulsions. Emulsification is one of the key steps in the preparation of microcapsules by spray drying and the emulsion properties (droplet size and viscosity) are closely related to encapsulation efficiency during spray-drying (Re, (1998) Dry Technol. 16(6):1195-236). The emulsions showed droplets with a mean size of approximately 2 μm and viscosity of about 1550 cps. The mean size and viscosity are both suitable for spray drying a flavor emulsion under high solid/low temperature drying conditions.

Moisture Content and Water Activity of Tomato Flavor Microcapsules. Flavor emulsions were spray dried and the moisture content and water activity of the resulting spray dried tomato flavor microcapsules containing potato protein and inulin were determined. The moisture content of the microcapsules was 4.8% and their water activity was 0.058. These results are consistent with the moisture and water activity specifications for dried powders in the food industry which are 3-5% and <0.3, respectively (Klaypradit & Huang (2008) LWT—Food Sci. Technol. 41(6):1133-9).

Particle Size and Morphology of Tomato Flavor Microcapsules. The particle size measurement of spray dried tomato flavor microcapsules showed monomodal particle size distribution with particles ranging from 2 to 120 μm and a mean particle diameter of 50.1 μm. To further investigate the particle structure, an SEM technique was used to investigate the overall morphology and inner microstructure of the microencapsulated flavor powders. The morphology of the sample containing the microcapsules appeared to be composed of agglomerated heterogeneous spheres of various sizes ranging from 2-100 μm. The inner image of the microcapsule revealed very dense particles with small oil droplets embedded within the wall materials containing potato protein isolates and inulin. The presence of some large holes was also observed inside the microcapsule indicative of air pockets formed during spray drying.

Total and Surface Oil of Tomato Flavor Microcapsules. Tomato flavor microcapsules were composed of 9.3% total oil content after spray drying. Considering an initial flavor load of 10 wt % in the formulation, the encapsulation efficiency was 93%. Encapsulation efficiency means the amount of oil encapsulated in the microcapsule divided by the amount of oil initially present in the feed slurry, expressed as percentage. Surface oil represents the portion of oil present on the surface of the microcapsule (Bao, et al. (2011) J. Food Sci. 76(1):E112-8). The presence of oil on the surface of microcapsule can negatively impact several characteristics of spray-dried powders such as flow, dispersion, shelf life stability, and sensory (lipid oxidation). The surface oil of tomato flavor microcapsule was trace and below the detection limit of the instrument (<0.4%). The amounts of total and surface oil of the instant microcapsules indicate that potato proteins in combination with inulin were able to produce tomato flavor microcapsule with excellent encapsulation efficacy.

Volatile Retention of Tomato Flavor Microcapsule. A natural tomato flavor composed of a 2-fold mixture of several volatile compounds dispersed in high oleic sunflower oil was encapsulated. The volatile compounds present in the flavor oil included dimethyl sulfide (DMS), (2E)-hexenal, B-gamma hexenol, isobutylthiazole, methional, damascenone, phenylethanol, beta-ionone, and eugenol. Total overall retention of 92.6% and 93% was obtained for tomato flavor feed emulsion and spray dried powder, respectively. These overall results indicated that the blend of potato proteins and inulin was an effective combination of wall materials for flavor microencapsulation with a high percentage of volatile retention during spray drying. The retention of individual aroma compounds after spray drying was also assessed as any change in one or more individual aroma compounds can affect the final flavor profile. The results of this analysis are presented in Table 3.

TABLE 3

| Flavor Compound | Spray Dried Microcapsule Retention |
| --- | --- |
| (2E)-hexenal | 76.8% |
| B-gamma hexenol | 93.7% |

TABLE 3-continued

| Flavor Compound | Spray Dried Microcapsule Retention |
|---|---|
| Isobutylthiazole | 96.3% |
| Methional | 69.7% |
| Damascenone | 97.8% |
| Phenylethanol | 95.7% |
| Beta-ionone | 97.4% |
| Eugenol | 99.4% |
| DMS | 82.5% |
| Total | 93.0% |

As shown by the amounts in Table 3, flavor retention in spray dry powder varied among the various volatile compounds. Overall, (2E)-hexenal and methional showed the lowest retention after spray drying compared to other volatile compounds. For methional and (2E)-hexenal, 69.7% and 76.8% were recovered in microencapsulated powder, respectively. The results are similar to those with previously reported, which indicated that high losses of (2E)-hexenal are primarily due to its relatively small molecular size (98.14 g/mol) and high vapor pressure (4.72 mmHg) of this compound (Bangs & Reineccius (1981) *J. Food Sci.* 47:254-259). In contrast to these two compounds, the other volatile compounds analyzed were efficiently retained in spray dried encapsulated powder with above 90% retention (Table 3). DMS, which was the main and most volatile compound in the tomato flavor, having a molecular weight of 62.13 g/mol and vapor pressure of 402 mmHg, also showed very strong retention with 82.5% after spray drying (Table 3).

Example 7: Beverage Emulsion Fabricated with Potato Proteins

An oil-in-water emulsion suitable for beverage application was formulated using potato protein as an emulsifier and Orange oil as a flavor per the formula summarized in Table 4. The emulsion was processed using a high shear mixer at 3000 rpm for 3.5 minutes followed by high pressure homogenization at 7000/500 psi for 3 passes. The pH of the emulsion was adjusted approximately 3.

TABLE 4

| Material | Gram |
|---|---|
| Demineralized water | 805.18 |
| Sodium Benzoate | 1.50 |
| Potassium Sorbate | 1.50 |
| Sodium Citrate | 0.80 |
| Citric acid | 2.50 |
| Potato Proteins | 62.75 |
| Orange Flavor | 70.50 |
| Ester Gum | 55.00 |
| Rosemary Extract | 0.07 |
| Tocopherols | 0.22 |

The emulsion fabricated with potato proteins exhibited a mean droplet size of approximately 0.7 micron. The particle size of the emulsion remained the same even after 3 months. No physical separation was recorded for the orange emulsion stored at room temperature.

Example 8: Beverage Emulsion Fabricated with Potato Proteins Containing Sweet Modulators The stability of the emulsion prepared as described in Example 7 was evaluated in the presence of a sweet modulator blend. In this experiment, a blend of four modulators (Rebaudioside C and three other *stevia*-based sweeteners), with a total concentration of 1% (0.25% for each modulator), was added into the orange emulsion post homogenization followed by mixing at room temperature. Initial particle size measurements exhibited a mean droplet diameter of 0.65 micron with a slight increase to 0.75 micron after 2 months storage at room temperature. No physical separation was recorded for the emulsion in the presence of the sweet modulator blend. The results indicated that the potato protein was cable of forming a stable emulsion even in presence of modulators.

What is claimed is:

1. An emulsion comprising:
   (a) a plurality of oil droplets each containing an active material; and
   (b) a first emulsifier that is an unhydrolyzed potato protein without chemical modification,
   wherein the emulsion has a pH of 1 to 5, the plurality of oil droplets is dispersed in a continuous phase, and the oil droplets and unhydrolyzed potato protein are present in the emulsion at a weight ratio in the range of 10:1 to 1:10,
   wherein the emulsion further comprises inulin as a carrier, and
   wherein the active material is a flavor.

2. The emulsion of claim 1, wherein each of the plurality of oil droplets has a diameter of 0.1 μm to 20 μm.

3. The emulsion of claim 1, wherein the oil droplets are present in an amount of 0.1% to 60% by weight of the emulsion.

4. The emulsion of claim 1, wherein the unhydrolyzed potato protein is present in an amount of 0.1% to 60% by weight of the emulsion.

5. The emulsion of claim 1, further comprising a second emulsifier.

6. The emulsion of claim 1, wherein the emulsion has a pH of 3 to 4.

7. The emulsion of claim 1, wherein and the oil droplets and unhydrolyzed potato protein are present in the emulsion at a ratio in the range of 2:1 to 1:2.

8. The emulsion of claim 1, further comprising an anti-oxidant.

9. An encapsulation particle comprising:
   (a) an active material; and
   (b) a matrix material containing an unhydrolyzed potato protein without chemical modification and inulin as a carrier,
   wherein the encapsulation particle has a diameter of 2 μm to 5000 μm, the active material is dispersed within the matrix material, and the weight ratio between the active material and the unhydrolyzed potato protein is 10:1 to 1:10.

10. The encapsulation particle of claim 9, wherein the carrier is present in an amount of 1% to 99% by weight of the encapsulation particle.

11. The encapsulation particle of claim 9, wherein the active material is selected from the group consisting of a fragrance, pro-fragrance, flavor, malodor counteractive agent, vitamin or derivative thereof, anti-inflammatory agent, fungicide, anesthetic, analgesic, antimicrobial active, anti-viral agent, anti-infectious agent, anti-acne agent, skin lightening agent, insect repellant, animal repellent, vermin repellent, emollient, skin moisturizing agent, wrinkle control agent, UV protection agent, fabric softener active, hard surface cleaning active, skin or hair conditioning agent, flame retardant, antistatic agent, taste modulator, cell, probiotic, colorant, vegetable oil, and combinations thereof.

12. The encapsulation particle of claim 9, wherein the active material is present in an amount of 0.1% to 60% by weight of the encapsulation particle.

13. The encapsulation particle of claim 9, wherein the unhydrolyzed potato protein is present in an amount of 0.1% to 99% by weight of the encapsulation particle.

14. The encapsulation particle of claim 9, further comprising an antioxidant.

15. A method for producing an encapsulation particle comprising:

(a) emulsifying an active material, an unhydrolyzed potato protein without chemical modification and inulin as a carrier to obtain an oil-in-water emulsion, wherein the oil-in-water emulsion has a pH of 1 to 5, and the active material and the unhydrolyzed potato protein are provided at a weight ratio of 10:1 to 1:10; and (b) drying the oil-in-water emulsion;

thereby producing an encapsulation particle.

16. The method of claim 15, wherein the oil-in-water emulsion has a pH of 3 to 4.

17. The method of claim 15, wherein the active material is a flavor.

18. The method of claim 15, wherein the oil-in-water emulsion is dried by spray drying, freeze drying, spray chilling, fluidized bed drying, drum drying, vacuum drying, film drying, belt drying, conduction drying, infrared drying, or a combination thereof.

19. The emulsion of claim 1, wherein the unhydrolyzed potato protein is an unhydrolyzed potato protein isolate having an isoelectric point above 4.8, a molecular weight of more than 4 kDa and a glycoalkaloid concentration of less than 150 ppm.

20. The emulsion of claim 19, wherein the unhydrolyzed potato protein isolate has a protein content of more than 90%.

* * * * *